US012730934B2

(12) United States Patent
Hickie et al.

(10) Patent No.: US 12,730,934 B2
(45) Date of Patent: Sep. 8, 2026

(54) SYSTEM AND METHOD FOR CREATING SECURED NEURAL NETWORKS

(71) Applicant: Irdeto B.V., Hoofddorp (NL)

(72) Inventors: Thomas William Hickie, Ottawa (CA); Philip Allan Eisen, Toronto (CA)

(73) Assignee: Irdeto B.V., Hoofddorp (NL)

( * ) Notice: Subject to any disclaimer, the term of this patent is extended or adjusted under 35 U.S.C. 154(b) by 221 days.

(21) Appl. No.: 18/622,437

(22) Filed: Mar. 29, 2024

(65) Prior Publication Data

US 2024/0330513 A1 Oct. 3, 2024

(30) Foreign Application Priority Data

Mar. 31, 2023 (EP) .................................... 23166066

(51) Int. Cl.
*G06F 21/62* (2013.01)

(52) U.S. Cl.
CPC ................................ *G06F 21/6254* (2013.01)

(58) Field of Classification Search
CPC ................................................... G06F 21/6254
See application file for complete search history.

(56) References Cited

U.S. PATENT DOCUMENTS 12,124,954 B1 * 10/2024 Commons .............. G06N 3/091
12,505,348 B2 * 12/2025 Chang .................... G06N 3/082
2020/0036510 A1 1/2020 Gomez et al.
2022/0197981 A1 6/2022 Marson et al.
2024/0202511 A1 * 6/2024 Grabska-Barwinska .................... G06N 3/098
2024/0212261 A1 * 6/2024 Takikawa .............. G06T 17/005
2024/0219907 A1 * 7/2024 Abeloe ................ G05D 1/0088
2024/0267568 A1 * 8/2024 Koyuncu ............... G06N 3/088
2024/0338559 A1 * 10/2024 Zhang .................... G06N 3/042
2024/0378417 A1 * 11/2024 Chilkuri ............... G06N 3/0442
2024/0403608 A1 * 12/2024 Allen ...................... G06F 7/023
2024/0414381 A1 * 12/2024 Wu ........................ G06N 3/088
2025/0030857 A1 * 1/2025 Wu ...................... G06N 3/0455
2025/0045579 A1 * 2/2025 Bercich .................... G06N 3/09
2025/0047295 A1 * 2/2025 Galvin ................. G06N 3/0455
(Continued)

OTHER PUBLICATIONS

International Search Report and Written Opinion of the International Searching Authority cited in corresponding International Application No. PCT/IB2024/053117, date of mailing Jul. 19, 2024, 12 pages.

(Continued)

*Primary Examiner* — Stephen T Gundry
(74) *Attorney, Agent, or Firm* — James J. DeCarlo; Greenberg Traurig, LLP

(57) ABSTRACT

A method of embedding an implementation of a shared-secret obfuscation mechanism into an existing neural network to provide the neural network with more secure data interfaces is disclosed. Disclosed implementations leverage a novel form of transcoding that can be implemented within a conventional neural network. This transcoding maps a span along a continuous number line on to a segment that defines a multidimensional projection. A definition of the transcoding properties (the mapping of spans to segments) is supplied to a form of compiler which produces a transcoding neural network (architecture+weights and biases) that can be embedded within an existing neural to cause the neural network to output transcoded data.

20 Claims, 18 Drawing Sheets

(56) References Cited

U.S. PATENT DOCUMENTS

| | | | | |
|---|---|---|---|---|
| 2025/0118291 | A1* | 4/2025 | Chiu | G10L 15/16 |
| 2025/0139457 | A1* | 5/2025 | Petersen | G06N 3/048 |
| 2025/0150093 | A1* | 5/2025 | Galvin | G06N 3/084 |
| 2025/0158802 | A1* | 5/2025 | Lam | G06N 3/048 |
| 2025/0181886 | A1* | 6/2025 | Rosselló Sanz | G06F 17/16 |
| 2025/0190752 | A1* | 6/2025 | Stockel | G06N 3/0464 |
| 2025/0238673 | A1* | 7/2025 | Commons | G06N 3/09 |
| 2025/0272392 | A1* | 8/2025 | Pogorelik | G06N 3/045 |
| 2025/0384299 | A1* | 12/2025 | Matlage | G06N 3/105 |

OTHER PUBLICATIONS

Kaur et al., "Chaos-based joint speech encryption scheme using SHA-1", Multimedia Tools and Applications (2021); vol. 80, No. 7, Jan. 3, 2021, pp. 10927-10947, XP037406498, https://doi.org/10.1007/s11042-020-10223-x, section 4.1.

Xu et al., "Lightweight and Unobtrusive Data Obfuscation at IoT Edge for Remote Inference", IEEE Internet of Things Journal, IEEE, USA, vol. 7, No. 10, Mar. 24, 2020, pp. 9540-9551.

Extended European Search Report, Application No. 23166066.3-1203, dated Sep. 1, 2023; 9 pages.

* cited by examiner

SYSTEM AND METHOD FOR CREATING SECURED NEURAL NETWORKS

BACKGROUND

Artificial Intelligence (AI) refers to computer models that simulate the cognitive processes of human thought. Recently AI has found many applications. For example, ChatGPT is an AI model that interacts with users to provide information and creative works in a conversational way. Further, autonomous, and semi-autonomous vehicles can use AI to recognize objects (such as pedestrians, traffic signs, and other vehicles), and ride-sharing apps can use AI to determine wait times and real-time ride pricing. One method of AI is Machine Learning (ML), which is used to find the probability of a certain outcome using analytical experimentation. ML leverages large sets of historical "training" data that are fed into a statistical model to "learn" one or more specific tasks, such as facial recognition. The more training data used, the more accurate the ML probability estimate will be.

Various ML algorithms are well-known (e.g., ADAPand RMSProp). ML models can be implemented by "neural networks", also known as "artificial neural networks" (ANNs). Neural networks mimic the way that biological neurons signal one another in the human brain. Neural networks are comprised of multiple layers of nodes, including an input layer, one or more internal/hidden layers, and an output layer. Each node, or artificial "neuron", connects to another and has an associated weight and threshold. If the output of any individual node is above the specified threshold value, that node is activated, sending data to the next layer of the network.

Neural network models represent mathematical functions. In this way they are similar to traditional computer software, but they are expressed in a different language (not human readable) and are often computationally discovered as opposed to authored (machine learning as opposed to engineering). Often these models perform an operation on sensitive data, such as making a cancer diagnosis or computing the risk of defaulting on a loan. Further, the models implemented by a neural network represent a considerable investment in intellectual property that is worth protecting.

As noted above, neural networks are generally architected as a set of layers, where each layer includes neurons that perform a computing operation. The neurons in one layer connect to the neurons in proceeding layers using weighted synapses and, in this way, data flows forward through a neural network. The first layer, where data goes into the neural network, is called the "input layer." Numeric values held in input neurons are propagated forward to the neurons in hidden layers. The final layer, called the "output layer", reports the final numeric results of the neural networks processing.

The input layer of a neural network can accept numeric data that, for example, corresponds to various real-world features. For an image processing neural network, these features might be pixel intensities (such as a number between 0 and 255) corresponding to X and Y coordinates in an image. For a cancer diagnosis model, the inputs could be, for example, descriptions of tissue or even blood test results. Each feature typically corresponds to one input neuron. The same holds true at the outputs. In other words, conventional neural networks normally have a one-to-one mapping between data and meaning. For example, a cancer screening neural network will generally output the presence or absence of a tumor by way of a neuron (where 0.0 represents absence and 1.0 represents presence).

In conventional neural network architectures, there is no mechanism for protecting data. The one-to-one mapping between data and meaning represents a significant security vulnerability. For example, if Bob knows what neural network is being used to process data about Alice, Bob can easily determine details about Alice by looking at the output of the neural network. For example Bob might be able to learn something very private about Alice (such as a cancer diagnosis or a credit score) based on the output of the neural network.

Data "masking" is the process of modifying sensitive data in such a way that it is of no or little value to unauthorized intruders while still being usable by software or authorized personnel. Data obfuscation can be used in programmed computing algorithms to protect information that is classified as personally identifiable information, or mission critical data, or is otherwise needs to be maintained as secure. However, the data must remain usable for the purposes of undertaking valid test cycles. Conventional neural network architectures are not readily adaptable to using obfuscated data because of the above-noted one-to-one mapping between data and meaning. Adapting existing data obfuscation methods (such as finite-ring encoding or even simple XOR based approaches) is difficult as a) we are limited in what mathematical operations we can apply to the data, and b) we are restricted to working with numbers as continuous scalar representations (as opposed to a finite sequence of bits). For this reason existing masking methods are not practical for use in neural networks. In summary, conventional neural network architectures don't have a pragmatic mechanism for producing protected outputs. The data coming in and going out is almost always 'clear', and this represents a security/privacy issue. Service providers who might want to use neural networks must contend with the privacy requirements of their end users (which is often legislated, such as with GDPR in the EU) as well as the risk of exposing their models to the outside world by way of a public interface (an API for example). This is especially true in hosted environments like AMAZON WEB SERVICES (AWS) where a neural network is performing computations off-site in the cloud.

While there are many known solutions for securing the flow of data (such as SSL and obfuscation) these protections end by the time data is presented to the runtime environment that executes a neural network model (e.g., KERAS, TORCH, TENSORFLOW, etc. . . . ) because the models themselves are designed to accept and output "raw" or clear data.

BRIEF SUMMARY

Disclosed implementations extend the protection boundary of neural networks and thus are more adherent to the principals of data security and privacy. Disclosed implementations include a method of embedding an implementation of a shared-secret obfuscation mechanism (which is not created with machine learning) into an existing neural network to provide the neural network with more secure data interfaces. Disclosed implementations leverage a novel form of transcoding that can be implemented within a conventional neural network. This transcoding maps a span along a continuous number line on to a segment that defines a multidimensional projection. A definition of the transcoding properties (the mapping of spans to segments) is supplied to a form of compiler which produces a transcoding neural network (architecture+weights and biases) that can then be appended, or embedded within, an original neural network to create a protected neural network that outputs transcoded data.

The transcoding neural networks protects data produced by the original neural network that might be considered sensitive or otherwise is to be maintained in privacy, such as a medical data, technical data, or financial data. As one example, the transcoding neural networks can be interfaced to neurons in the output layer of a neural network. However, disclosed implementations can be used to protect neurons within any one or more layers of an original neural network, thereby obfuscating the entirety of the neural network and thus protecting data at all stages of execution of a neural network.

One disclosed implementation is a method for securing a neural network model, the method comprising: receiving an output specification data structure specifying outputs of an output layer of an original neural network, wherein the original neural network is configured to execute a model; creating an n-dimensional matrix for at least one output of the output layer of the original neural network by, defining a plurality of segments of a scalar value X of the output along a number line, determining a corresponding projection algorithm for each of the plurality of segments, wherein at least one of the corresponding projection algorithms is different from the other corresponding projection algorithms, and for each of the plurality of segments, projecting a scalar value X of the output onto a predetermined surface, in accordance with the corresponding projection algorithm to thereby generate an n-Dimensional vector X' as an obfuscation function of X; creating a transcoding neural network that implements the obfuscation function of X; and interfacing the transcoding neural network with the original neural network to thereby create a protected neural network which executed the model. To decode X' back in to X would require knowledge of the segments and the projection parameters associated with each. For example, for each segment S X' could be reversed back to an X using the segments projection parameters (Sp), and then pass the X back into projection Sp to produce a new X'-so long as the resulting X' still sits on segment S, we can presume that X is in fact the decoded value.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown.

DETAILED DESCRIPTION

Figure 1:
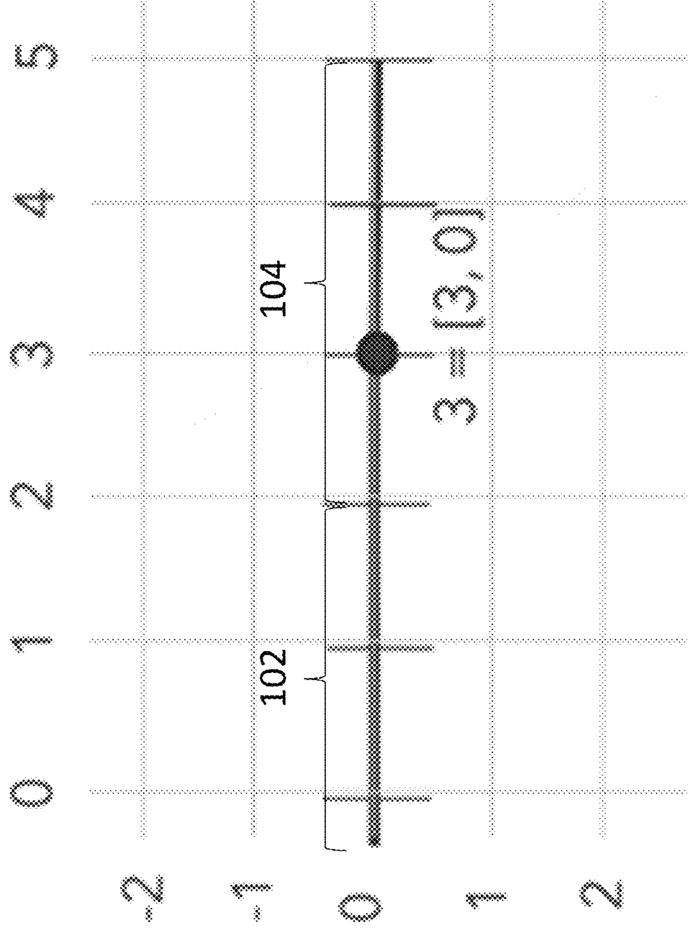
FIG. 1 is a graph of values along a number line.

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

Transcoding neural networks in accordance with disclosed implementations allow the output of a neural network (or any neuron of a neural network) to be protected. When a conventional neural network ("original neural network") is protected with a transcoding neural network, protected data remains private because the protected data (or state of any neuron in the network) is encoded via an encoding scheme that includes secret coefficients. Disclosed implementations work natively within a conventional runtime environment of the protected neural network because the transcoding neural network is implemented as a neural network itself. Data protection can be optimized to confound AI/ML based analysis and be resilient to model cloning and adversarial attacks. The transcoding can be engineered to balance protection with resource requirements and/or to protect the most sensitive or likely values of a variable to the greatest degree.

"Transcoding neural networks" include neural networks that accept the output of an artificial neuron as input and produce a transcoded value as output (though transcoding neural networks can be applied anywhere a floating-point number is used). For example, if the input to the transcoding neural network is the number 1.23 then the transformed output could be a sequence of numbers such as [56.3, 23.3, 0.0001, −8.1, 3.1415, 12, 0]. In the same way that there are many possible keys for a cryptographic system, there are many possible parameters for a transcoding neural network. This set of parameters gets converted into the weights and biases that form the layers of a neural network and precisely control the way that a number is transcoded. Therefore, reversing the transcoding requires precise knowledge about the parameters of the specific Transcoding neural network that performed the encoding (the shared secret). Transcoding neural networks can be any size, consisting of tens or millions of parameters.

Assuming that a single value X that lies along a continuous distribution is to be converted into some encoding, X', that exhibits certain properties, it might be desirable that:

- for any scalar value X, an n-Dimensional vector X' is produced such that knowledge of only one dimension in X' is insufficient to reproduce X;
- the relationship between X and X' is non-linear;
- if X is increased at some monotonic rate, the resulting X' should 'jump' all over the place as if it's random, i.e., the encoding reduces (or eliminates) any apparent correlation between X and X';
- the computational cost of producing the encoding can be controlled to balance the security level of the encoding with required compute resources; and
- the encoding can be implemented as a conventional artificial neural network.

Disclosed implementations recognize that all numbers exist on a number line. In this way numbers can be thought of as a distance along some path, even if that's not how they're being used. Further, a number X can be projected onto any surface to thereby convert a 1-Dimensional number into a 2-Dimensional vector (or a vector of any desired number of dimensions).

Even when projected into a higher dimension as X', the original value, X, can be characterized as a distance along a number line. Disclosed implementations associate precisely defined spans of X (segments) with precisely defined encoding algorithms that define how the projection of X into X' is performed. For example, as shown in FIG. 1, all values of X spanning from 0.0 and 2.0 can be defined as first line segment 102 and values of X spanning 2.0 and 5.0 can be defined as second line segment 104. Each segment can have a corresponding encoding algorithm associated therewith, which algorithms can each have unique properties that are used to project X onto a multi-dimensional surface.

Figure 2:
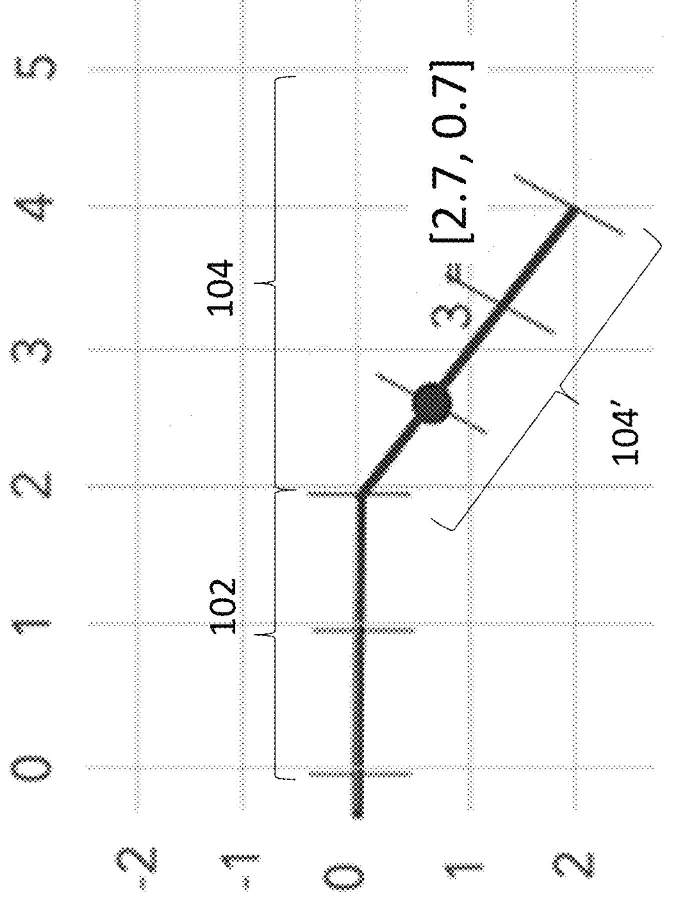
FIG. 2 is an example of a graph of numbers along a number line projected in two dimensions in accordance with disclosed implementations.
Figure 3:
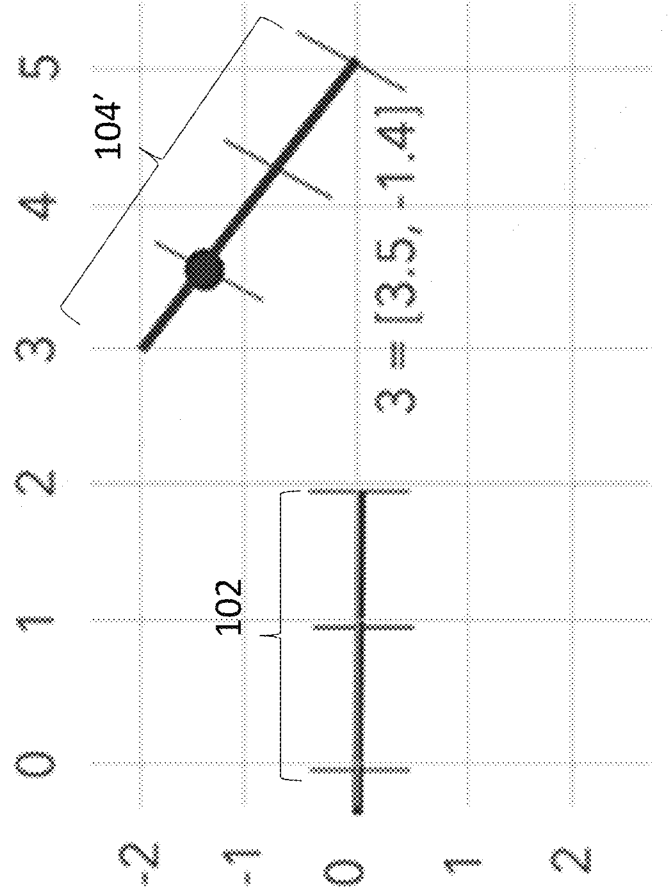
FIG. 3 is another example of a graph of numbers along a number line projected in two dimensions in accordance with disclosed implementations.

X can define an index into a table describing a line segment and X can be projected along the line segment. The projections don't need to be onto a continuous path however. X might be the distance along the sum of segments, but its projection can be anything. For example, as shown in FIG. 2, first line segment 102 can be associated with an encoding algorithm F (X)=[X,0] (the line segment itself) and second line segment 102 can be associated with an encoding algorithm that is the projection of the values along line segment 104'. In this example, X=3 is encoded into X'=[2.7, 0.7]. As a further example, by decoupling the intercept of each segment from our treatment of X as a distance along a path (defined by the scaled sum of segment lengths) we can create outputs that are 'disjointed' and display a higher degree of liminality (i.e., ambiguity or disorientation) as shown in FIG. 3. In this manner, the 1-dimensional continuous value X can be projected onto several different multi-dimensional surfaces using only simple linear operations.

This mechanism has properties that make it useful as a transcoding algorithm when applied to neural networks. While seemingly simple, this system of mapping a span (or range of values) to a segment, and then projecting the number using the parameters associated with the mapped segment, provides control over how X' behaves as a system. As long as X' can be decoded back into X when necessary, specific desired properties of the encoding can be engineered as discussed in more detail below.

Disclosed implementations can be implemented as a fully connected feed forward neural network using only Linear and Rectified Linear activation functions. This means that a transcoding neural network can be implemented natively within all of the existing neural network frameworks (such as Keras, Torch, etc.) and is compatible with all conventional environments and hardware platforms.

Further, the mapping of X to X' doesn't need to follow any "rhyme or reason." A random span of X can be assigned to a randomly generated projection algorithm. This makes the encoding more secure, because the input and output are, to all appearances, uncorrelated. Of course, values of X that fall along the same span will remain correlated as they're using the same projection parameters/encoding algorithm. However, by defining the spans carefully (by incorporation of knowledge about the distribution of X, for example) potential discovery of such correlation can be minimized. An infinite number of non-linear and highly confusing mappings can be used for transcoding.

Additionally, the order of the encodings can be shuffled to make it more difficult to discover the encoding and thereby more difficult to reverse the encodings. For example, instead of all encoded elements appearing in order, we can alter the order so that reconstruction would require knowledge of the re-ordering (e.g., how changing the order of pixels in an image hides the meaning of the image). In order for shuffling to be effective, it is desirable to have multiple elements to shuffle. Disclosed implementations allow converting a single scalar into a vector of arbitrary size. Each element of the vector can be self-similar in terms of its dynamics to make identification of a specific element difficult. The encoding disclosed herein allows precise control of each dimension of the output encoding.

Figure 4:
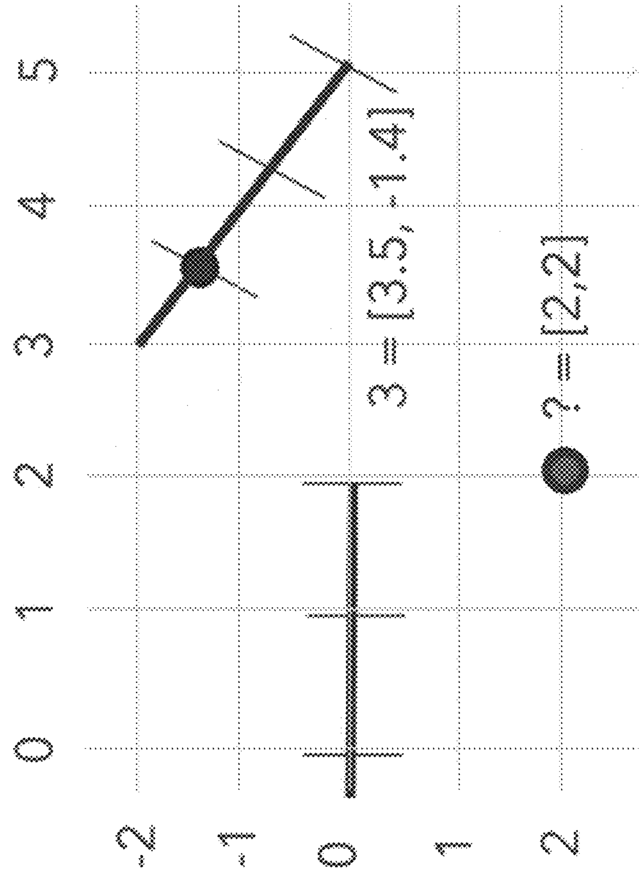
FIG. 4 is the graph of FIG. 3 illustrating an invalid value in accordance with disclosed implementations . . . .

In disclosed implementations, a specific transcoding neural network projects X onto a very specific path. Any deviation from this path cannot be a product of the Transcoding neural network. For example, as shown in FIG. 4, the value pair [2,2] cannot be a product of the transcoding example of FIG. 3 because a [2,2] is not on either of the projected lines. Therefore, it is simple to determine if a value of X' is valid by simply decoding X', and then re-encoding the result. If they do not match (within some floating point tolerance), the encoding isn't authentic. As and example, a dictionary of X—>X' values could be produced. Such a table would be very large. To address this, the X' values could be identified at the ends of each line segment and it can be checked whether a given value lies on any of the segments defined by those endpoints. To address the possibility of a dictionary attack, multiple transcoding networks can be used in connection with an input encoding scheme and a random number can be passed into the algorithm, propagated to the end of the network, and fed it into a transcoding network to encode it into a vector. The resulting encodings can be used to alter the encodings that get produced using the methods described herein. As an example:

R→>encoded into R'

X→>encoded into X'

R'+X'=EvenBetter'

Decoding would require knowledge of the random number passed in as well as the parameters of both transcoding networks.

Figure 5:
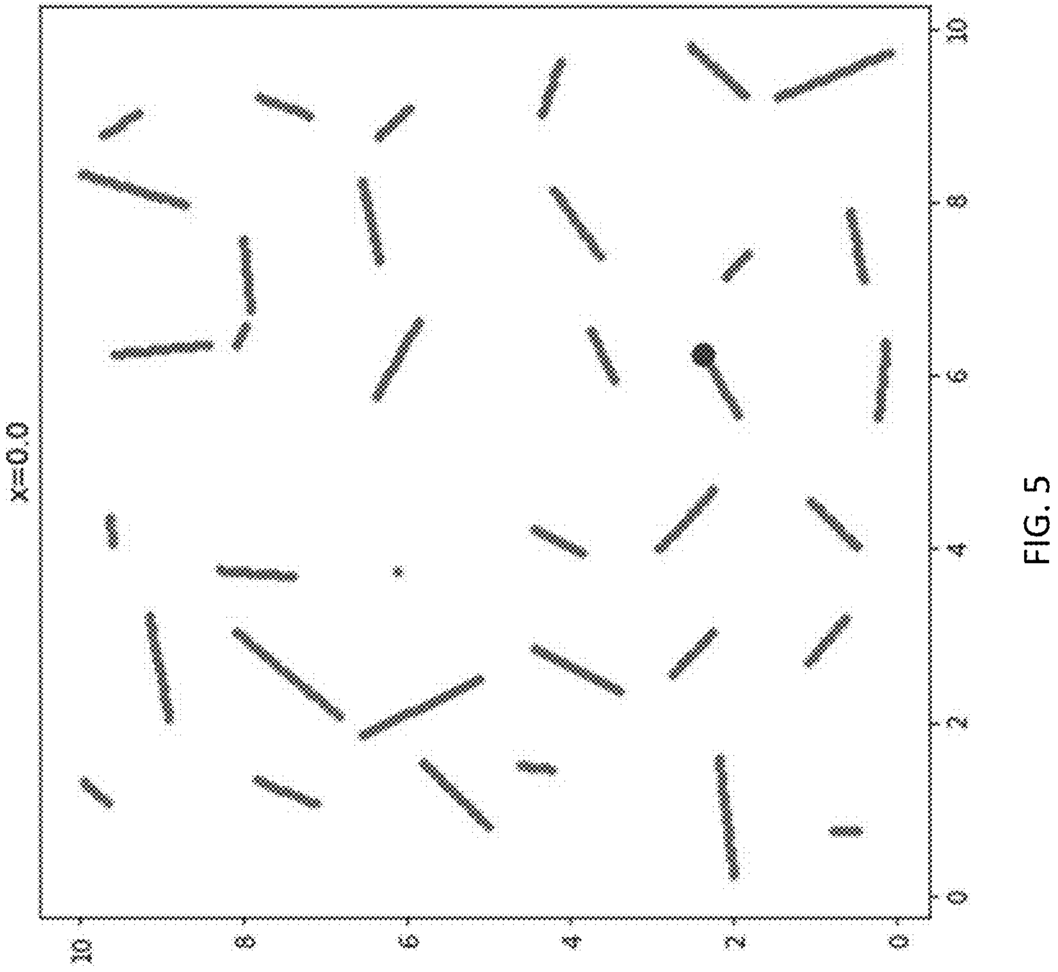
FIG. 5 is a graph of transcoded results illustrating segments in accordance with disclosed implementations.

As long as a few constraints are satisfied, the number of segments used by the encoder can be increased and therefore any appearance of correlation between X and X' can be decreased. For example, the encoding shown in FIG. 5 has many discontinuous projected line segments. In other words, bigger and more computationally expensive transcoding neural networks produce higher levels of security by decreasing the appearance of correlation between X and X'. Table 1 below illustrates this concept by showing how a relatively small increase in segments results in a very large increase in parameters.

TABLE 1

| Unique 2D Segments | Parameters |
|---|---|
| 36 (6 × 6) | 49,073 |
| 144 (12 × 12) | 771,701 |
| 575 (24 × 24 | 12,293,573 |

While an engineered cost profile is advantageous, it is also desirable to ensure that the security budget is spent in an efficient manner. To this end, a transcoding neural network can be designed to be more (or less) effective for specific ranges of X by altering the resolution of the segments in a targeted manner. This could be very appropriate for layers that use a hyperbolic tangent or sigmoid activation function, as these neurons are more likely to produce values in the 'off' or 'on' state.

Figure 6:
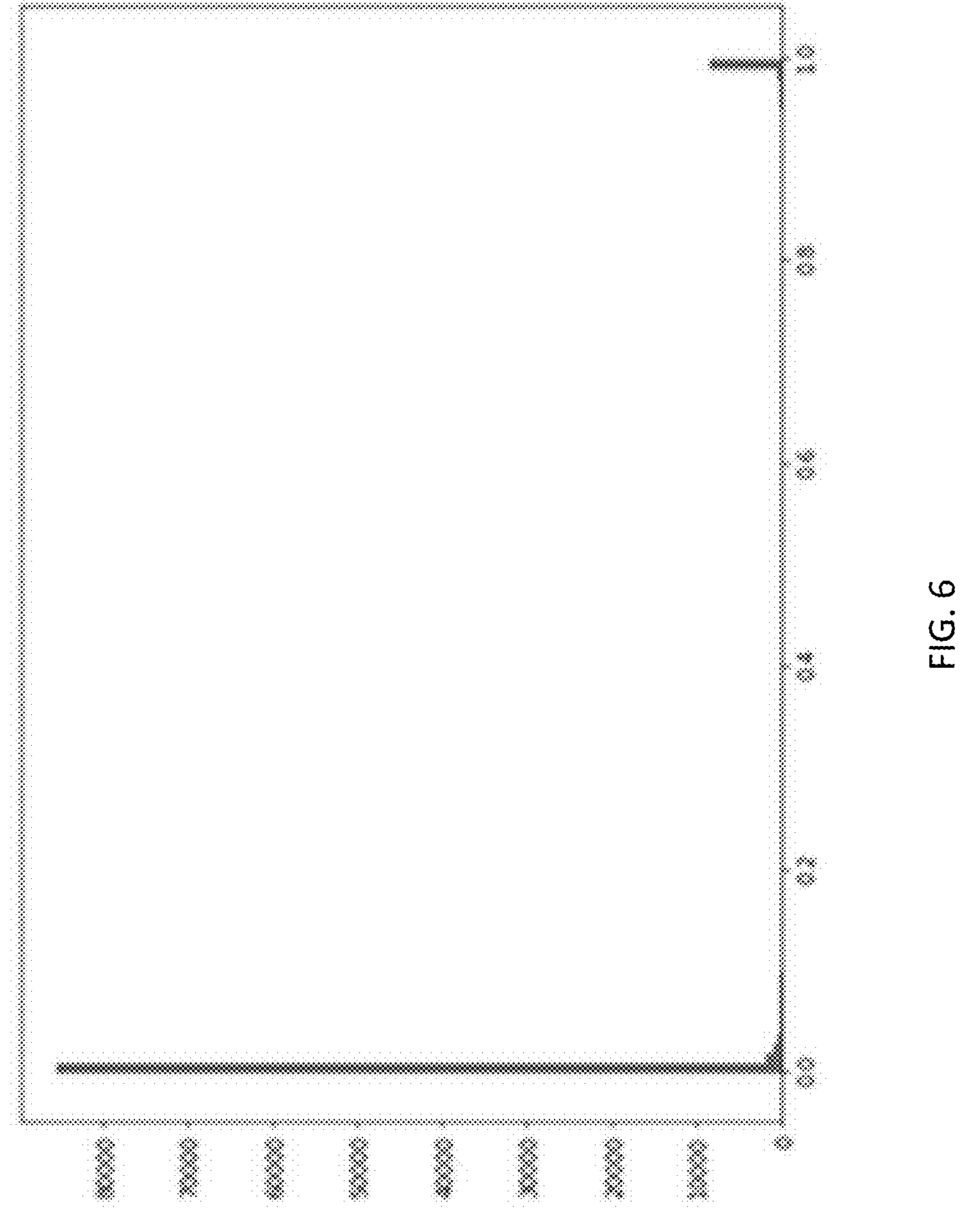
FIG. 6 is a histogram illustrating the relative frequency for specific values produced by the neuron in the output layer of a handwritten digit classifier in accordance with disclosed implementations.
Figure 7:
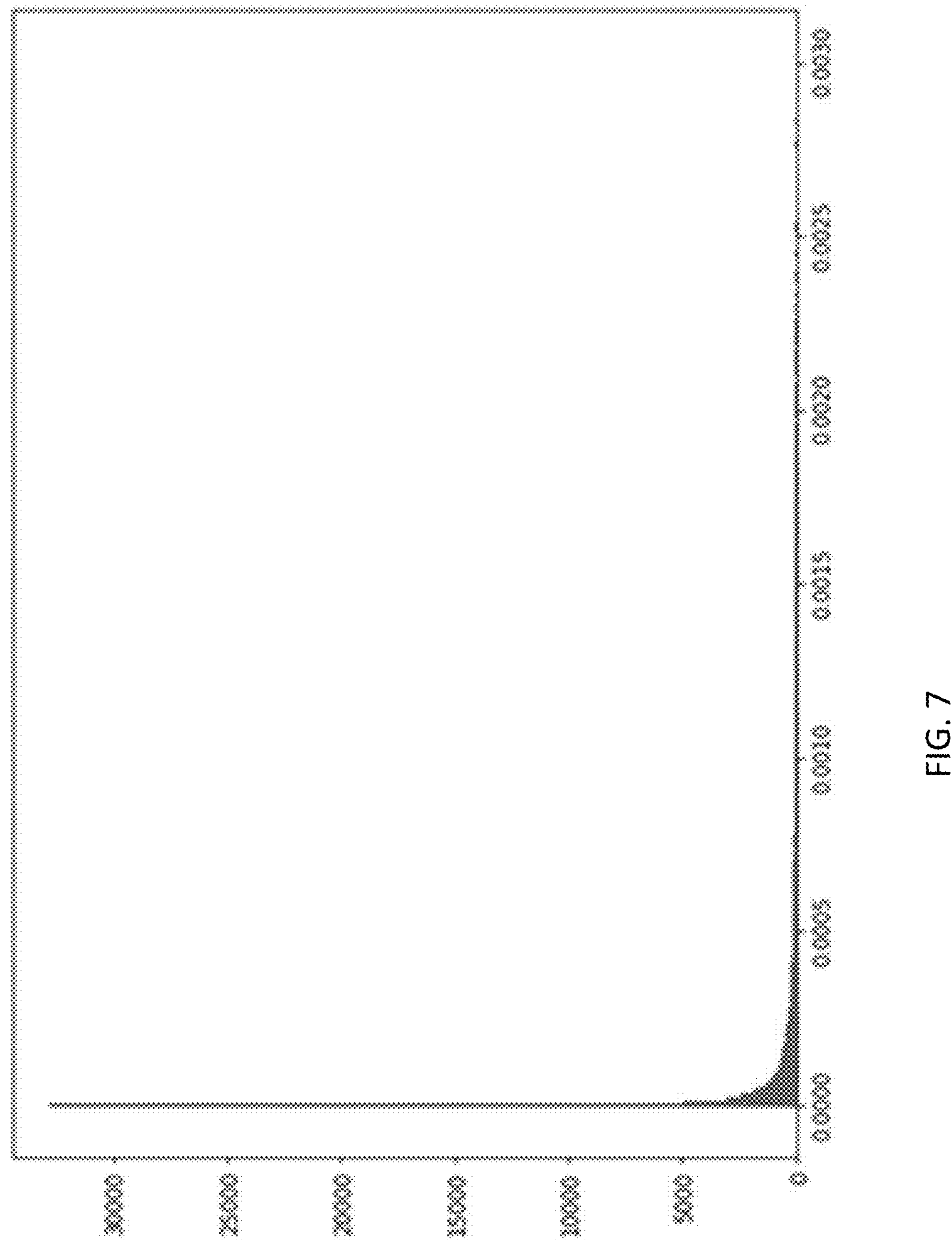
FIG. 7 is a histogram illustrating the data of FIG. 6 in greater detail.

For example, a handwritten digit classifier presented with the number 7 will set one output neuron to the high state (0.9825) while keeping the other neurons in a low state (0.0012, 0.15, 0.123 . . . ). The histogram of FIG. 6 shows the relative frequency for specific values produced by the neuron in the output layer of a handwritten digit classifier. As expected, in the handwritten digit classifier example, 90% of the values are close to 0.0 (the "no" case) and 10% are close to 1.0 (the "yes" case), for any digit 9 out of 10 neurons will be low and only one will be high. A closer look at the distribution, as shown in FIG. 7, shows that the neurons in the output layer are producing values close to 0.0, with 30% of the outputs being less than 0.003. This characteristic can be leveraged in the transcoding neural network by specifying many very small segments for values of X close to 0, and relatively few segments elsewhere to thereby obtain a transcoding neural network that can be considerably smaller but much more performant in that likely encodings will not have similar values.

Figure 8:
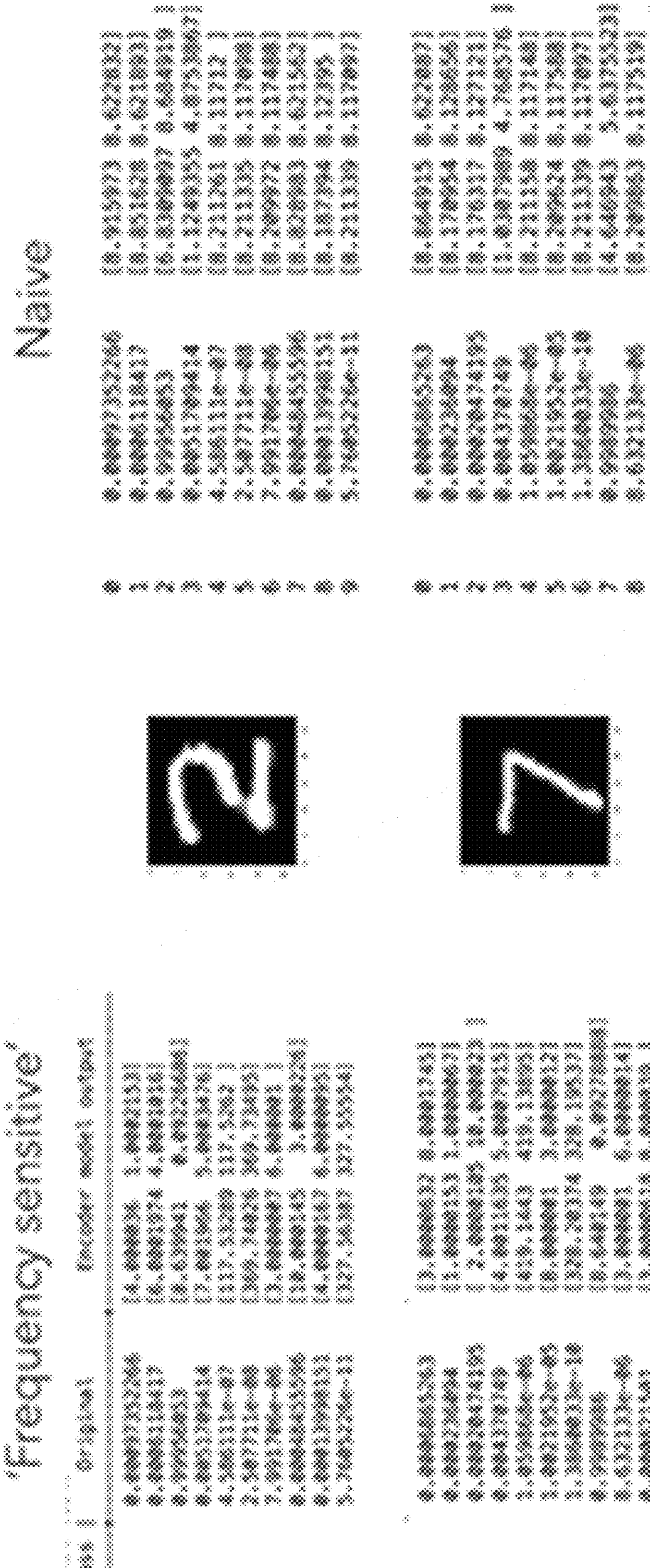
FIG. 8 illustrates an example of the results of testing an optimized encoding in accordance with disclosed implementations.

FIG. 8 illustrates the results of testing an optimized encoding consisting of approximately 150 segments (vs. a transcoding neural network using 1000 segments of equal length), where the length of the segment was based on a known distribution of values produce by MNIST classifier neurons. The optimized version produced encodings that are far more chaotic despite requiring less resources to compute. Specifically, in FIG. 8, values that are close to 0 take on very different encodings when using the 'Frequency sensitive' encoding (the left hand side of the figure) whereas values close to 0 tend to be more similar when using the naïve approach (the right hand side of the figure). Someone looking at the encoded values from the naïve approach might be able to deduce what's going on because of the obvious pattern.

Neural networks are susceptible to a number of machine learning assisted attacks (such as model cloning and adversarial learning). One way of mitigating the effectiveness of these attacks is to hide the learnable signal used by the attacker. Using disclosed implementations, an output encoding can be engineered in a manner that minimizes this signal while still maintaining low correlation between X and X'.

Figure 9:
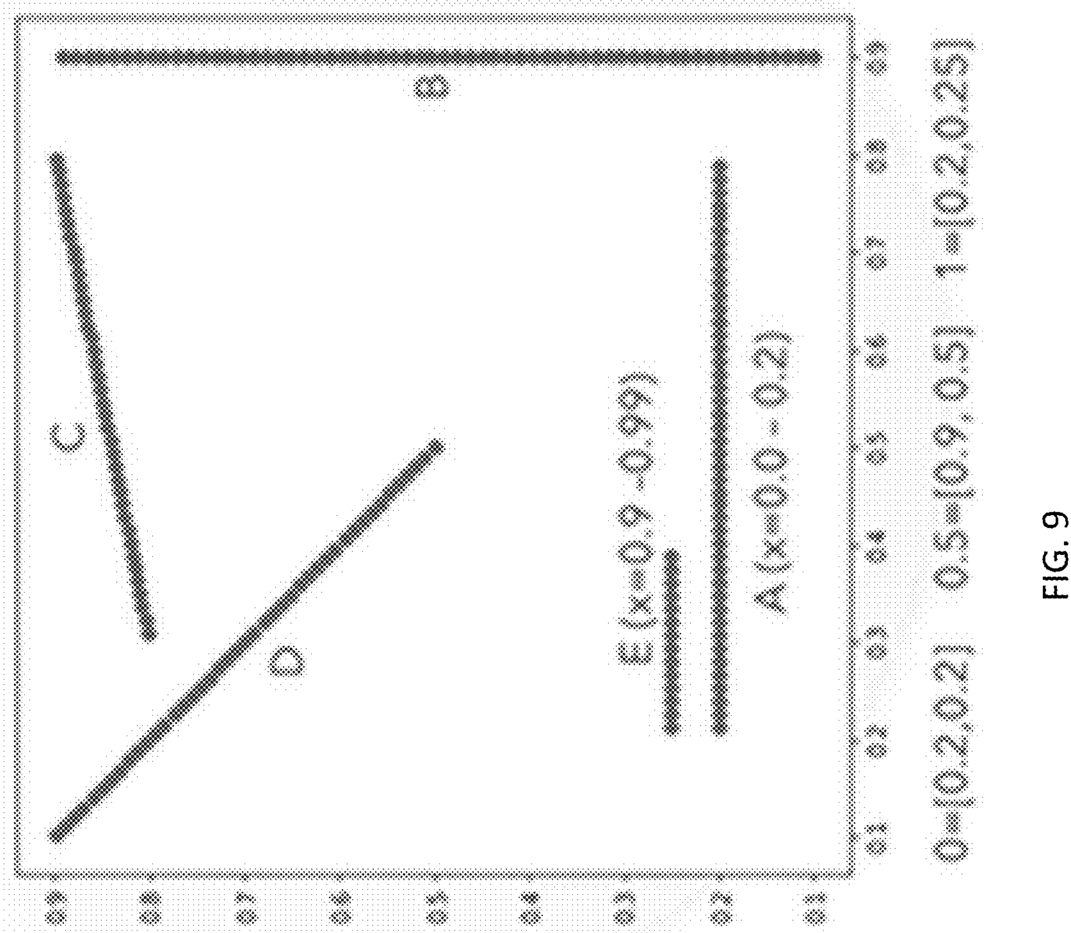
FIG. 9 illustrates another example of the results of testing an optimized encoding in accordance with disclosed implementations.

For example, if an encoding is desired to be optimized to protect a 'confidence' value, the encoding can be engineered so that values of low confidence (e.g., 0.0-0.1) produce a very similar (but slightly different) encoding to values of high confidence (e.g., 0.90-0.99). Line segment projections for an example of such an encoding are shown in FIG. 9. Note that the encoded values E for 0.9-9.9 are very close to the encoded values A for 0.0-0.2.

Other examples include engineering an encoding to create massive discrepancies in the scale out of the outputs. For example, within the same transcoding neural network some values of X might produce encoded numbers that are very small (X'=[0.00001, 1.01000056]) whereas others might produce values that are quite large (X'=[23523562365, −99235.2342350235]). This would be difficult for a machine learning algorithm to understand, but easy to engineer with a transcoding neural network of the disclosed implementations.

A simple example application of the disclosed implementations is set forth below. In this example, the encoding assumes that X is a number in the range of 0.0 to 1.0. Note that the math below is not precise as it has been simplified for illustration. For example, 0.333 is not the correct number—but ⅓rd is simpler to understand than (0.8+0.8+1.0)/3. In the example, three segments have been defined. Segment A is from 0.0 to 0.33, segment B is from 0.33 to 0.66, and segment C is from 0.66 to 1.0. When value of X falls within a given segment, it will be projected onto a 2D surface by putting it somewhere along a line-segment. We can define each of these projections (also referred to as "encoding algorithms" herein) using a set of coordinate pairs (denoting the beginning and end of projection line segment).

```
cPath = [[[0.0,0.0],[0.8,0.0]], # Segment A
    [[1.0,0.0],[1.0,0.8]], # Segment B
      [[1.0,1.0],[0.0,1.0]], # Segment C
   ]
```

In this way, any value of X can be encoded into an X' that consists of two coordinates (w, h). When X is in the range of 0 to 0.333, X' is computed in accordance with the corresponding parameters (algorithm/projection) as follows:

X=x/0.333 (Where, as a percentage, along segment A)

$$w = 0.8 * x + 0.0$$

$$h = 0.0 * x + 0.0$$

$$xp = [w, h]$$

When X is in the range 0.333 to 0.666, X' is computed using Segment B's parameters (projection/algorithm):

X=(x−0.333)/0.333 # Where are we along segment B $$w = 0.0 * x + 1.0$$

$$h = 1.0 * x + 0$$

$$xp = [w, h]$$

When X is in the range 0.666 to 1.0, X' is computed using Segment C's parameters (projection/algorithm):

x=(x−0.666)/0.333 # Where, as a percentage, are we along segment C $$w = -1.0 * x + 1.0$$

$$h = 0.0 * x + 1.0$$

$$xp = [w, h]$$

Figure 10:
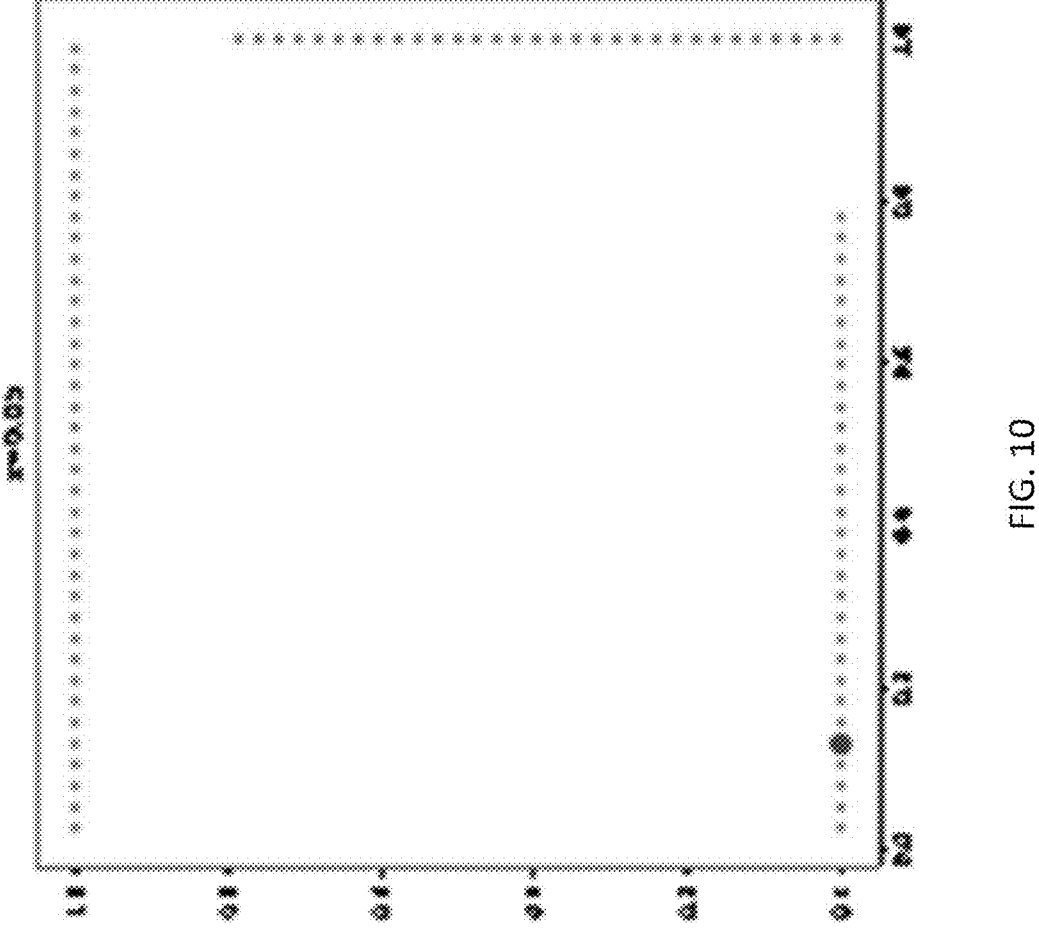
FIG. 10 illustrates another example of the results of testing an optimized encoding in accordance with disclosed implementations.

Plotting all values of X between 0 and 1.0 using the above rules results in the graph shown in FIG. 10. It can be seen that a single value of X can be reprojected in a manner that can be precisely controlled, to be along one of three distinct lines in this example. Such a mechanism can be readily implemented as a neural network using conventional techniques. Even this simple example satisfies the desired condition/results discussed above. Knowing only w or h (the singular components of X') isn't enough to reverse X' because there are many encodings of X that produce the same value of w and the relationship between X and X' is non-linear (while it is linear for some values of X, that linearity breaks wherever it is engineered as such). Further, the example ensures that the encodings can 'jump' even when X doesn't. For example, the encoded value for 0.3333 is quite different from 0.33334, i.e., there are 'gaps' in the graph of FIG. 10.

Figure 11:
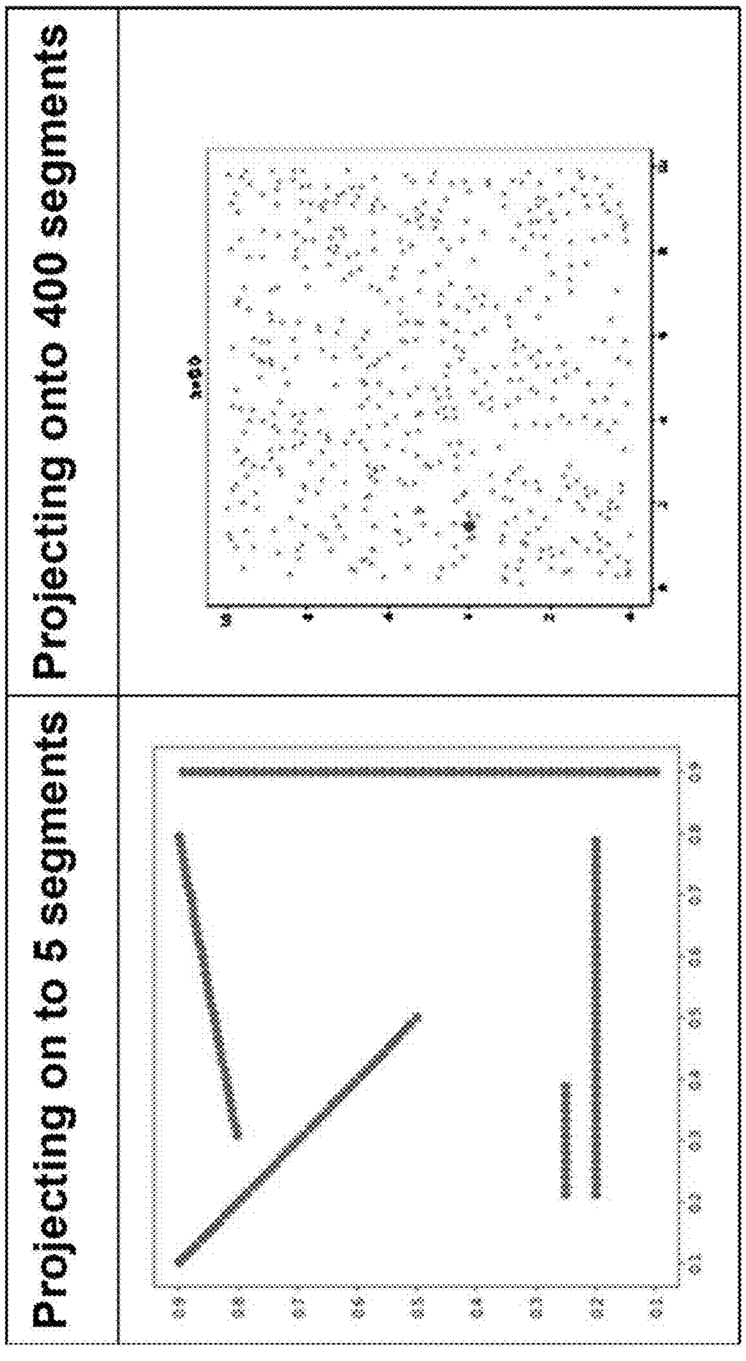
FIG. 11 illustrates the results of increasing the number of segments in accordance with disclosed implementations.

Complexity of the encoding can be increased by adding more segments to the encoding. FIG. 11 illustrates this concept. The graph on the left is the result of encoding with 5 segments. It can be seen that, within each segment, there is a correlation between X and X'. The graph on the right is the result of encoding using 400 segments. In this graph, it is difficult (if not impossible) to ascertain any correlation between X and X'. Complexity can also be increased by increasing the dimensionality of the encoding (from 2D to 3D . . . nD) to thereby reduce any correlation between X and X'.

A description of how a neural network that projects a value X into a projection based on segments is set forth below.

For example, the following list of 3D point pairs describes the word 'IRDETO'.

```
cPath =    [ [[0.1, 0.9,0], [0.3, 0.9,0]],        # I
             [[0.2,0.88,0], [0.2, 0.15,0]],
             [[0.1, 0.1,0], [0.3, 0.1,0]],
             [[0.4, 0.1,1], [0.4, 0.5,1]],        # R
             [[0.41,0.5,1], [0.5, 0.5,1]],
             [[0.5,0.49,1], [0.5, 0.3,1]],
             [[0.6,0.1,2], [0.7, 0.1,2]],         # D
             [[0.7,0.12,2], [0.7, 0.9,2]],
             [[0.6,0.12,2], [0.6, 0.5,2]],
             [[0.61,0.5,2], [0.68, 0.5,2]],
             [[0.8,0.1,3], [0.9, 0.1,3]],         # E
             [[0.9,0.5,3], [0.9, 0.3,3]],
             [[0.8,0.12,3], [0.8, 0.5,3]],
             [[0.81,0.5,3], [0.88, 0.5,3]],
             [[0.81,0.3,3], [0.88, 0.3,3]],
             [[1.05,0.1,4], [1.05, 0.88,4]],      # T
             [[0.91,0.7,4], [1.02, 0.7,4]],
             [[1.08,0.7,4], [1.18, 0.7,4]],
             [[1.2,0.1,5], [1.3, 0.1,5]],         # O
```

-continued

```
             [[1.3,0.5,5], [1.3, 0.1,5]],
             [[1.2,0.12,5], [1.2, 0.5,5]],
             [[1.21,0.5,5], [1.28, 0.5,5]]
]
```

This path can be converted into a transcoding neural network using the single line of code shown below:

```
cnet = createTranscoding neural network(cPath,
unitLength = True, debug=True)
```

This produces a neural network model (in Keras using a Tensorflow backend) consisting of 6 layers and approximately 30,000 parameters, as defined below.

Model: "sequential_39"

| Layer (type) | Output Shape | Param # |
|---|---|---|
| layer_scale (Dense) | (None, 1) | 2 |
| layer_attr (Dense) | (Noxe, 110) | 220 |
| layer_decision (Dense) | (None, 111) | 12323 |
| layer_negate (Dense) | (None, 88) | 9856 |
| layer_normalize (Dense) | (None, 88) | 7832 |
| layer_out (Dense) | (None, 3) | 267 |

Total params: 30,498
Trainable params: 30,498
Non-trainable params: 6

Figure 12:
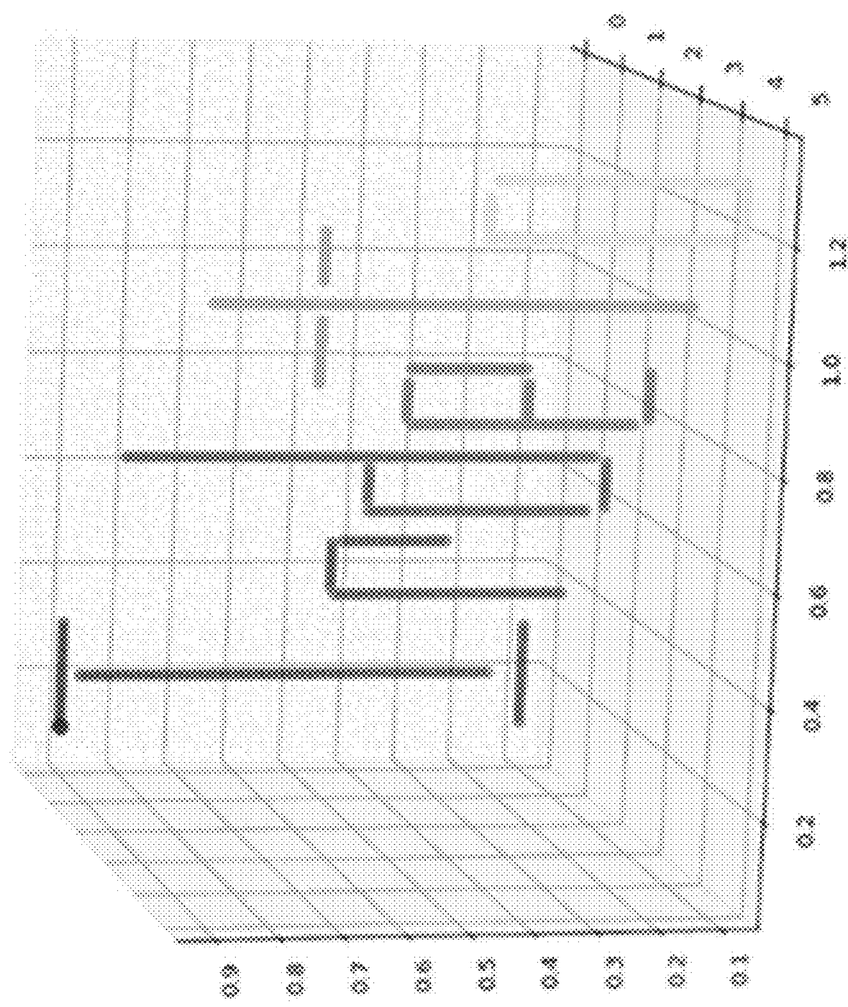
FIG. 12 illustrates a definition of segments in accordance with disclosed implementations.

If we pass the values 0 to 1.0 to this network and plot the output (as a 3D scatter plot) it will produce the output shown in FIG. 12. Of course, this is not the most cryptographically interesting encoding, but it illustrates how much control can be exercised over the transcoding neural network. To build a Transcoding neural network that acts as a cipher we instead allocate a number of segments randomly and in such a way as to satisfy some known dynamics of the number space being protected (e.g., the distribution of values)—essentially a random table of projections connected to spans whose lengths match the distribution of outputs produced by the neuron being protected.

There are three architectural components to this solution. The first component is the architecture of an existing neural network (the original network model being protected). The second component is the architecture of an individual transcoding neural network (a pattern we use to protect an existing neural network). The third component is the architecture of a protected neural network.

Figure 13:
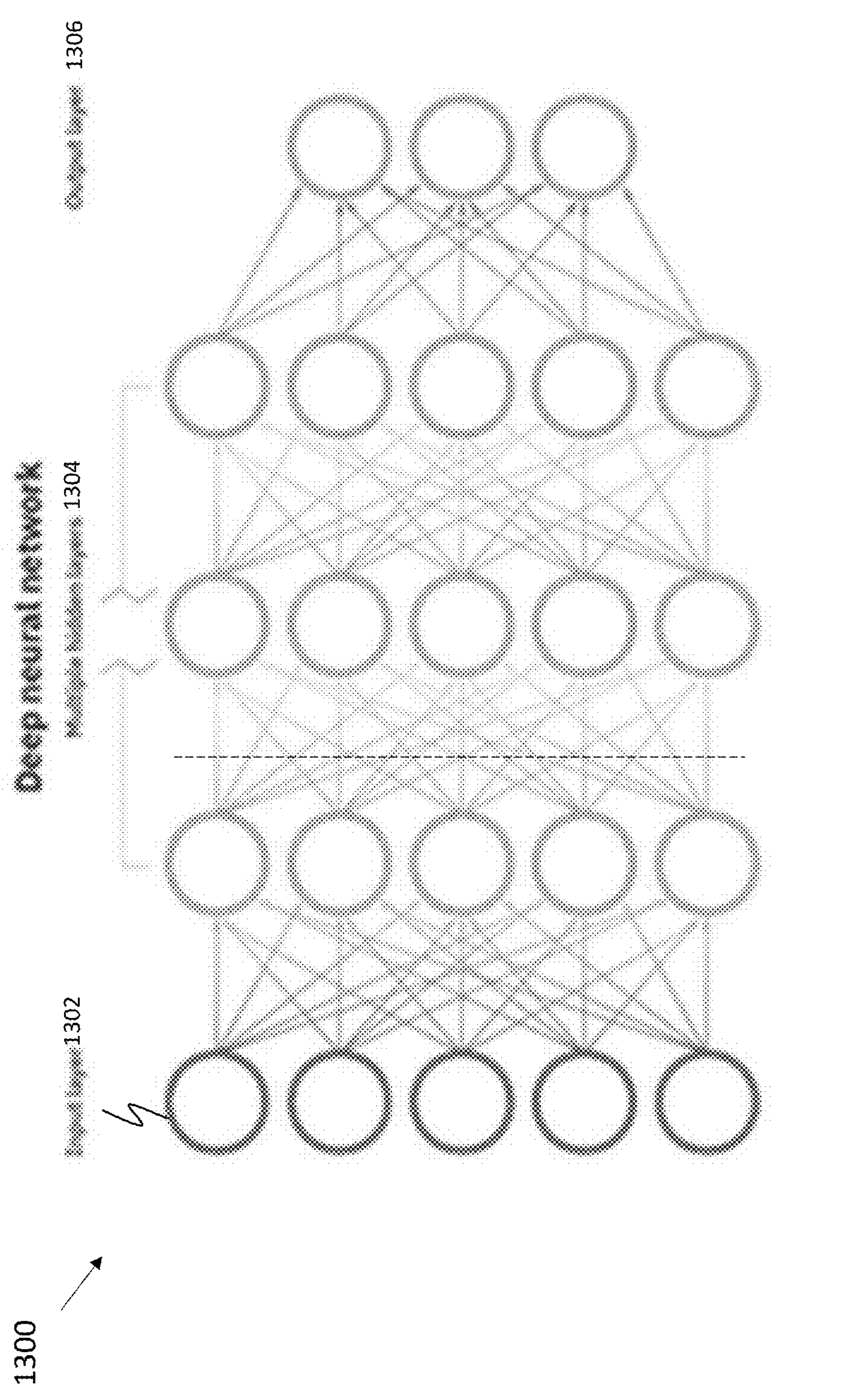
FIG. 13 illustrates an example of a conventional neural network architecture.

Most neural networks share a similar architecture, in that they are comprised of layers that feed into each other in a sequential manner, as shown in FIG. 13. The conventional neural network 1300 shown in FIG. 13 includes input layer 1302, hidden layers 1304 and output layer 1306. Each layer in neural network 1300 is comprised of neurons (represented by the circles in FIG. 13) which receive input from the neurons in the layer behind (to the left of) them and send their output to neurons in the layer ahead (to the right of) them. The architecture of the neural network often means that each set of two consecutive layers can be considered a standalone neural network. Therefore, neural network 1300 can be split into two standalone neural networks (at the dashed line for example), feeding the output of one network as input into the other, and the resulting output would be identical to that of the undivided neural network. The opposite is also true, i.e., two neural networks can be merged. Using a library like Keras or Torch layers can be added to the beginning, the end, even the middle, of an existing neural network.

Figure 14:
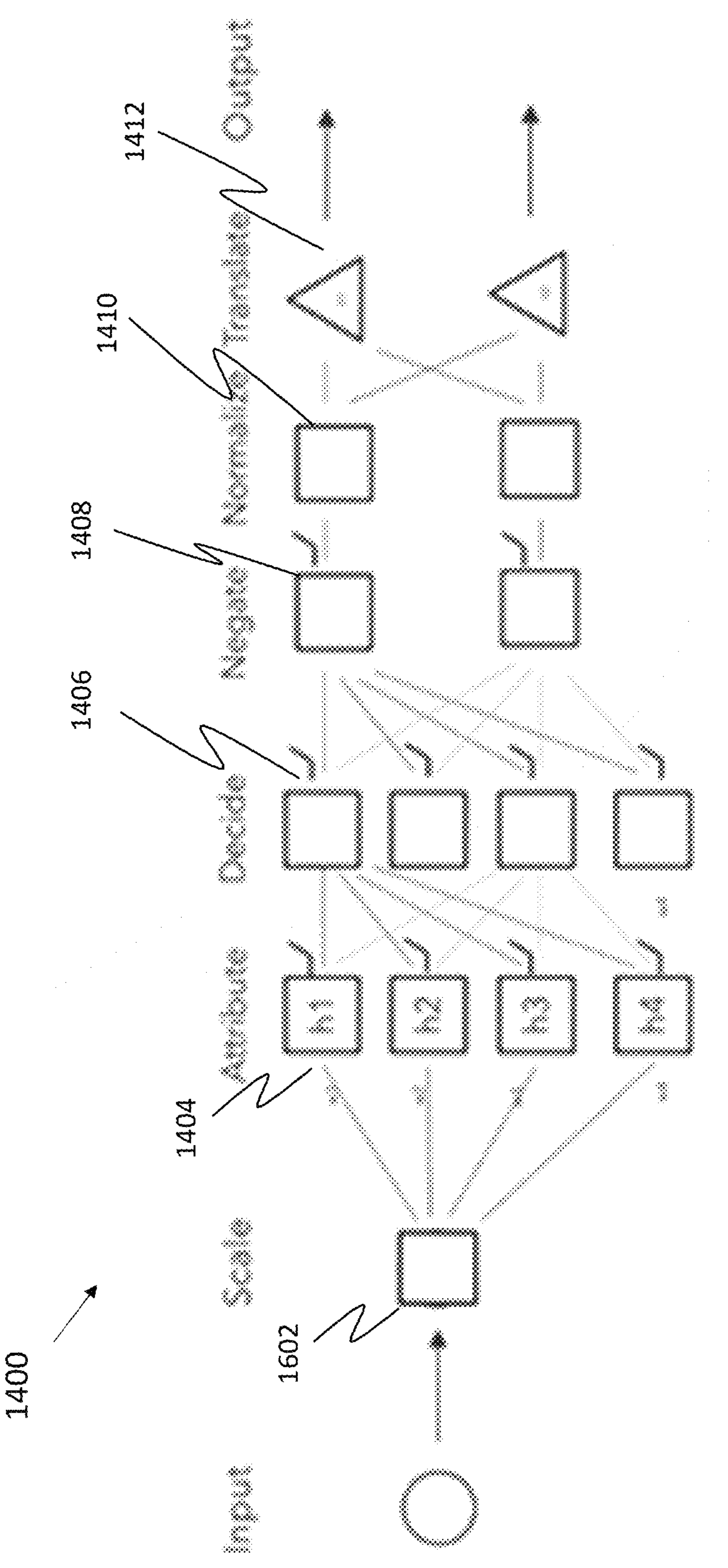
FIG. 14 illustrates an example architecture of a transcoding neural network in accordance with disclosed implementations.

Since the transcoding neural network of the disclosed implementations is also a neural network, it can be added onto existing neural networks to thereby create a protected neural network. A transcoding neural network maps an input value, X, onto a target segment, and then projects X onto a surface, as defined by an encoding algorithm (parameters) associated with the target segment to determine X'. One example of a transcoding neural network is illustrated in FIG. 14. Transcoding neural network 1400 consists of six (6) layers—the size of each layer depends on the parameters used to build the transcoding neural network. The layers include scaling layer 1402, attribute layer 1404, decision layer, 1404, negation layer 1408, normalization layer 1410, and translation layer 1412. Each layer can be designed and constructed using conventional techniques to accomplish the novel processing disclosed herein. The more segments the transcoding neural network uses, or the more dimensions in the output projection, the larger each layer will become. The depth (total number of layers) does not need to change, however. For example, a transcoding neural network that outputs a 12-dimensional projection will be larger than a transcoding neural network that only outputs a 2-dimensional output, but each can have 6 layers.

Each layer of transcoding neural network 1400 accomplishes a specific task by way of a set of matrix operations. The matrix operations are embodied by the ‘weights and biases’ within the specific layer of the transcoding neural network. When the layers are combined they allow us to determine which segment X belongs to, and then how to project X into the coordinate system defined by its target segment. The value of the weights and biases is determined by the parameters that define the different projection segments.

An example parameterization of transcoding neural network 1600 architecture is set forth below.

```
### Create the weight and bias tables ###
    l0Weights, l0Biases = makeScalingLayer(scaleFactor =
inputScaleFactor, translationAmount=0.0)
    l1Weights, l1Biases = makeAttributionLayer (projections,
pointDistanceTable, pathDistanceTable, buff = buff, debug =
debug)
    l2Weights, l2Biases = makeDecisionLayer(projections,
pointDistanceTable, pathDistanceTable)
    l3Weights, l3Biases = makeNegationLayer(projections,
pointDistanceTable, pathDistanceTable)
    l4Weights, l4Biases = makeNormalizationLayer(projections,
pointDistanceTable, pathDistanceTable, signParams)
    l5Weights, l5Biases = makeProjectionLayer(projections,
transformParams)
    # Assemble the model
    confuserModel = Sequential( )
    confuserModel.add(Dense(len(l0Biases), input_dim=1,
activation=‘linear’, name=“layer_scale”))
    confuserModel.add(Dense(len(l1Biases), activation=‘relu’,
name=“layer_attr”))
    confuserModel.add(Dense(len(l2Biases), activation=‘relu’,
name=“layer_decision”))
    confuserModel.add(Dense(len(l3Biases), activation=‘relu’,
name=‘layer_negate’))
    confuserModel.add(Dense(len(l4Biases),
activation=‘linear’, name=‘layer_normalize’))
    confuserModel.add(Dense(len(l5Biases),
activation=‘linear’, name=‘layer_out’))
```

Each layer accomplishes matrix operations, including padding distances with non-zero support, and exploiting Rectified Linear Units and large negative numbers to approximate ‘if then’ operations. For example, if we were to write out the operations for decision layer 1406 (assuming that transcoding neural network 1600 consists of only three 2-dimensional segments (A, B, and C), it might look like this:

```
neg = −999999999.9
zer = 0.0
    #IsA,  #IsB,  #IsC,  IsInf,  Av,  Bv,  Cv,  Ax,  Ay,  Bx,  By,  Cx,  Cy
l2Weights = [
        [0,    0,    0,    0,  1,  0,  0,  0,  0,  0,  0,  0,  0],  # Dist from A0
        [1,    neg   neg,  0,  0,  0,  0,  0,  0,  0,  0,  0,  0],  # Dist to A1
        [0,    0,    0,    0,  0,  1,  0,  0,  0,  0,  0,  0,  0],  # Dist from B0
        [zer,  1,    neg,  0,  0,  0,  0,  0,  0,  0,  0,  0,  0],  # Dist to B1
        [0,    0,    0,    1,  0,  0,  1,  0,  0,  0,  0,  0,  0],  # Dist from C0
        [zer,  zer,  1,    0,  0,  0,  0,  0,  0,  0,  0,  0,  0],  # Dist to C1
        [0,    0,    0,    0,  0,  0,  0,  1,  0,  0,  0,  0,  0],  # |Ax| Intercepts
        [0,    0,    0,    0,  0,  0,  0,  0,  1,  0,  0,  0,  0],  # |Ay|
        [0,    0,    0,    0,  0,  0,  0,  0,  0,  1,  0,  0,  0],  # |Bx|
        [0,    0,    0,    0,  0,  0,  0,  0,  0,  0,  1,  0,  0],  # |By|
        [0,    0,    0,    0,  0,  0,  0,  0,  0,  0,  0,  1,  0],  # |Cx|
        [0,    0,    0,    0,  0,  0,  0,  0,  0,  0,  0,  0,  1]   # |Cy|
  ]
#       This allows us to pass in a value of X that’s longer than our path
#         v
l2Bias = [ 0, 0, 0, −lenCD, 0, 0, 0, 0, 0, 0, 0, 0, 0]
```

Figure 15:
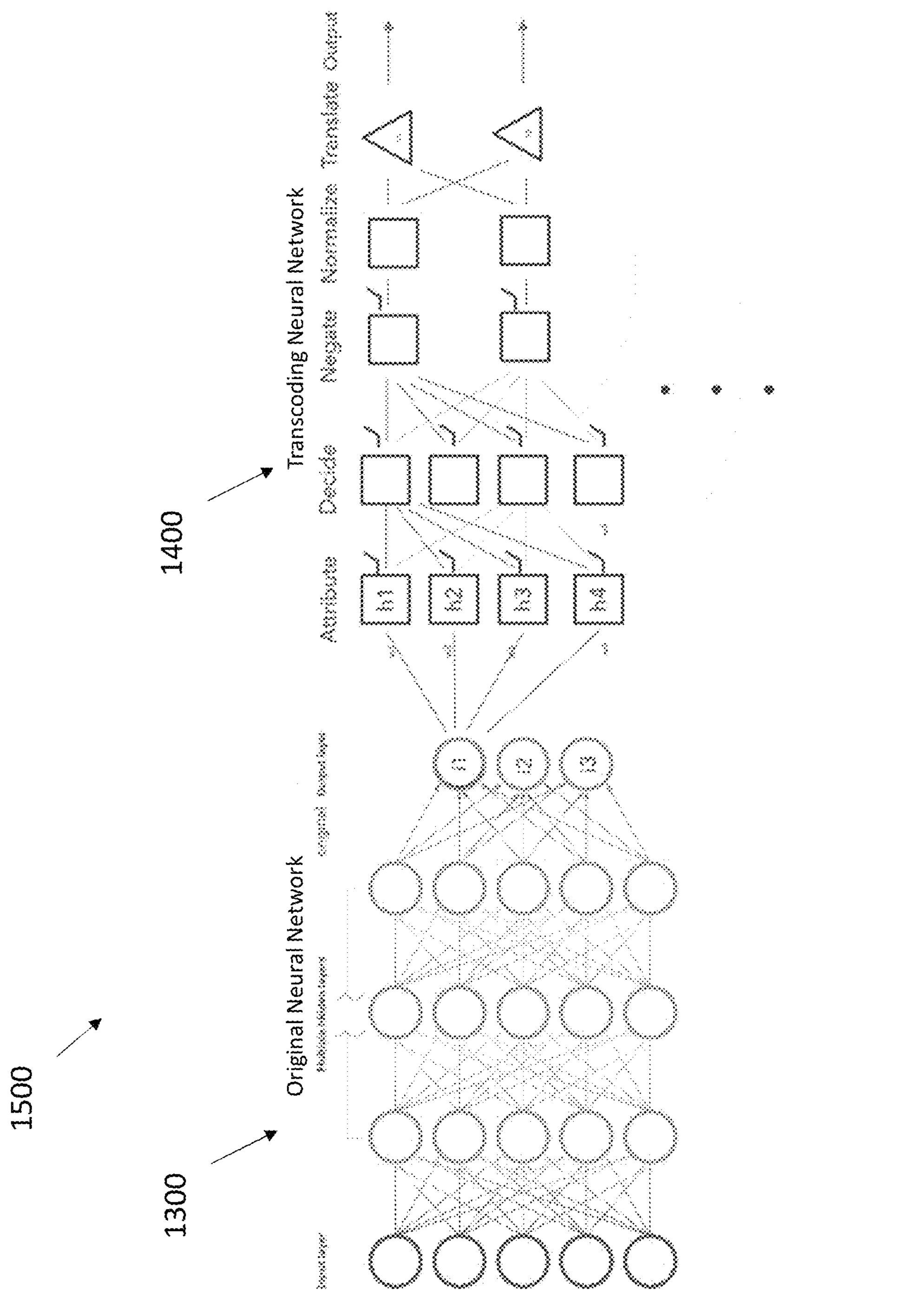
FIG. 15 illustrates a transcoding neural network interfaced with an original neural network in accordance with disclosed implementations.

To protect an existing neural network (and thereby create a protected neural network) a transcoding neural network can be appended to each of the output neurons in the original network as shown in FIG. 15 in which transcoding neural network 1400 of FIG. 14 is shown appended to one output neuron i1 of unprotected neural network 1300 to create protected network 1500. While not shown for the sake of simplicity, a transcoding network 1400 can be appended to each output of original neural network 1300. In FIG. 15, the original neural network contains three outputs, a transcoding neural network would be appended to each of the three output neurons i1, i2, and i3. These transcoding neural networks can be unique (have different parameters with respect to one another) or share the same parameters. The transcoding neural networks coupled to different outputs of an unprotected neural network could even have different dimensions in their output.

Further, transcoding neural networks can be chained together, so that output i3 will alter the encoding of output i1 and i2. There are many ways to do this. For example, X'=f (X+i3). This decoding requires that we know i3 so that the input of the neural network provides a sort of 'key' that alters the output in a reversible way. As another example, the projected value of X' can be altered in translation layer 1412 or normalization layer 1410 (as these layers can utilize a linear activation and so have no limits) with yet another number (which defines a key X'=key*f (X)). In other words, it's possible for the transcoding neural network to take another parameter (a key) that will alter the encoding, making it like a cipher that contains not only an embedded shared secret (the parameters of the transcoding neural network), but also a temporary shared secret (a value passed in from the unprotected neural network).

Figure 16:
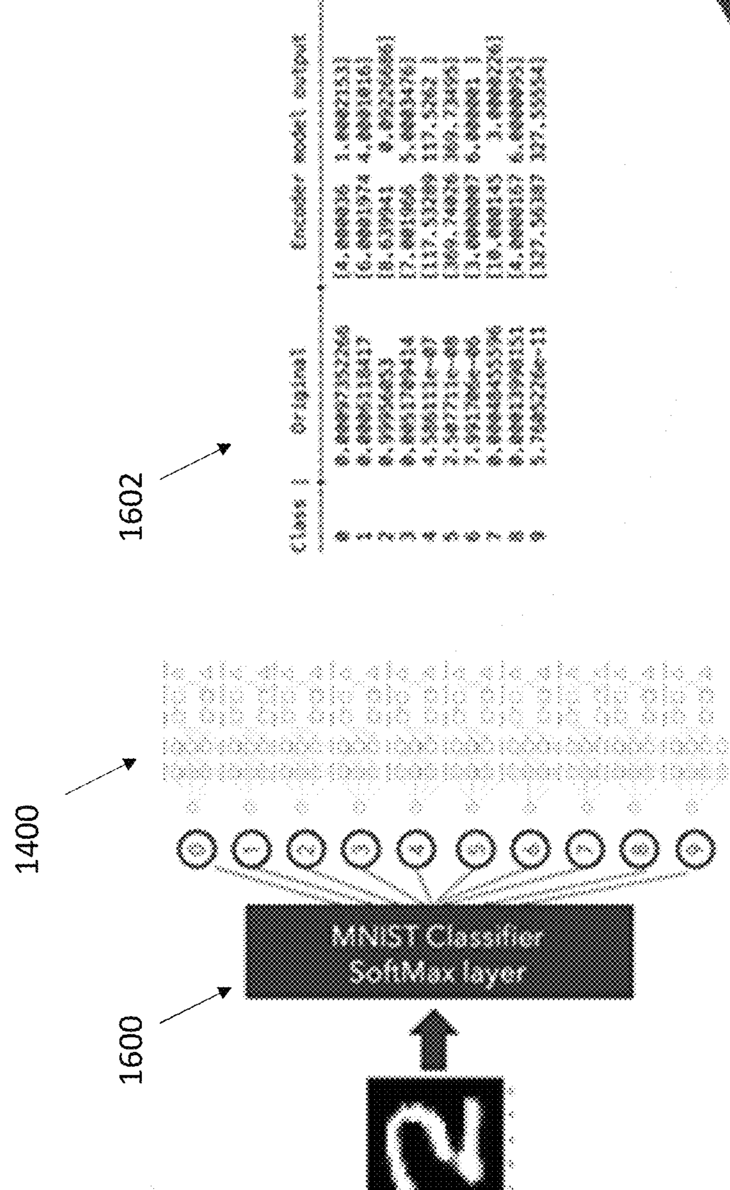
FIG. 16 illustrates an example of a protected neural network in accordance with disclosed implementations.

FIG. 16 illustrates an example of a protected neural network in accordance with disclosed implementations. In this example MNIST handwritten digit classifier 1600 (as an "original neural network") is protected with transcoding neural network 1400 that produces a 2-dimensional output. Since there are 10 outputs in the MNIST handwritten digit classifier, the protected network produces 20 outputs. Ten transcoding neural networks 1400 were appended to the end of the neural network, one transcoding neural network for each output neuron. The parameters for each transcoding neural network are the same in this example. Sample output table 1602 shows the 20 values produced by the protected MNIST model (i.e. the combination of MNIST network 1600 and transcoding neural network 1400) when presented with a handwritten 2 as an input.

Figure 17:
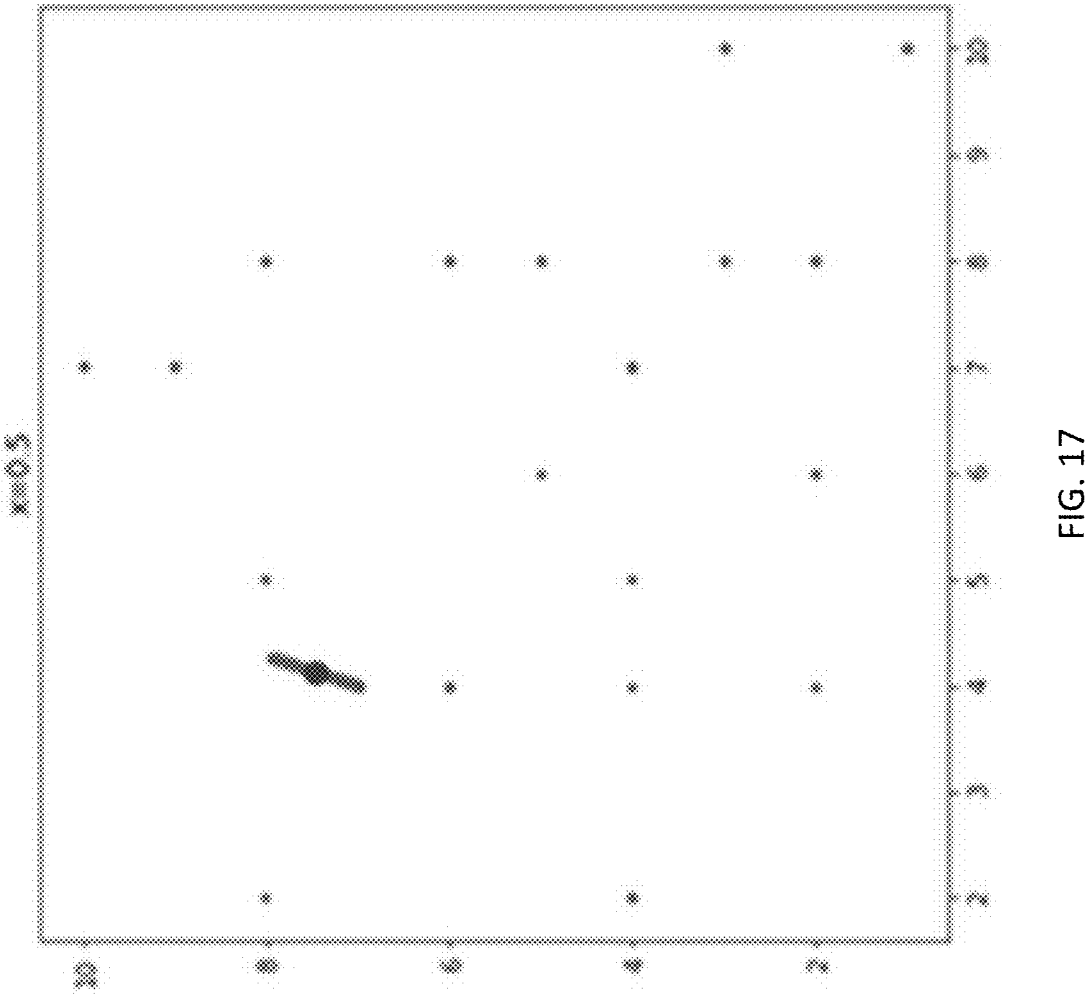
FIG. 17 illustrates an example of a projection table embedded within a transcoding neural network in accordance with disclosed implementations.

The projection table embedded within the transcoding neural network in the example of FIG. 16 is shown in the graph of FIG. 17. In this example, most of the spans are very small, and allocated to range of values in X that are higher frequency. The line near coordinates 4,8 is a single large span that covers a range of values almost never produced by the MNIST handwritten digit classifier. This illustrates the flexibility of the disclosed implementations.

Figure 18:
FIG. 18 is a flow chart illustrating a process for creating a protected neural network in accordance with disclosed implementations.
Figure 18:
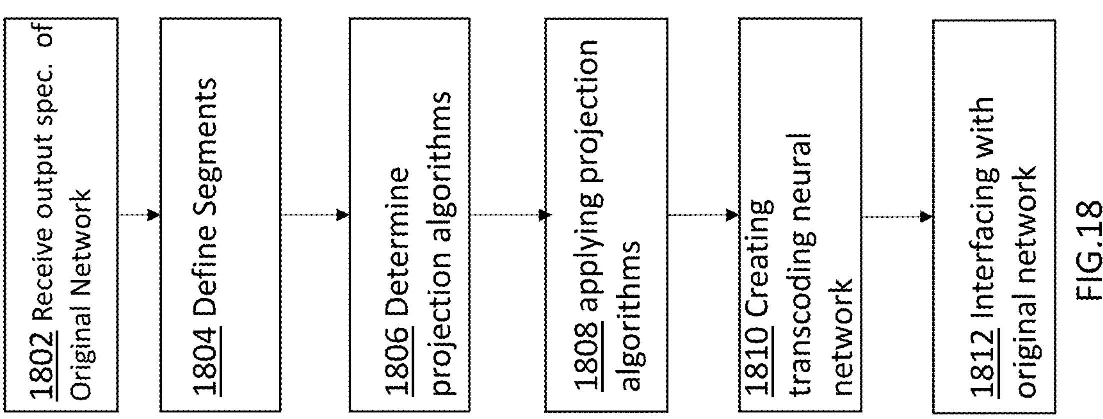

FIG. 18 is a flow chart illustrating a process for creating a protected neural network in accordance with disclosed implementations. At step 1802 an output specification data structure specifying outputs of an output layer of an original neural network is received. Then an n-dimensional matrix is created by executing steps 1804 to 1808. At step 1804 a plurality of segments of the output are defined. At step 1806, a projection algorithm for each of the plurality of segments is defined. Preferably at least one of the corresponding projection algorithms is different from the other corresponding projection algorithms. At step 1808, the projection algorithms are applied to values of the outputs corresponding to the plurality of segments to project a scalar value X of the output onto a predetermined surface and thereby generate an n-Dimensional vector X' as an obfuscation function of X. At step 1810, a transcoding neural network that implements the obfuscation function of X is created. At step 1812, the transcoding neural network is interfaced with the original network to thereby create a protected neural network.

In other examples, the linear projections defined for each segment can be replaced with any of the common neuron activation functions (like the sigmoid or hyperbolic tangent), or something described by yet another neural network. The resulting transcoding neural network would work in the same way in that it would be segmented. However, the final layer would apply some other function (nonlinear). Instead of line segments there would be curve segments. Further, the output of one transcoding neural network can be fed into the inputs of other transcoding neural to accomplish a highly complex encoding. Further, instead of accepting a single input X, a Transcoding neural network could accept multiple inputs to perform a multivariate projection.

A requirement for decoding X' into X is that there generally should be a one-to-one relationship between X and the encoding. The Transcoding neural network has no such limitation, however. Therefore, the transcoding neural network produces values which cannot be reversed without knowledge of the transcoding parameters. Further, a transcoding neural network could be engineered to produce irreversible encodings for a specific range of X. These many-to-one encodings could be useful for signaling specific conditions, or even hiding values in a 'Whitebox' manner (for example, a value decodes to 1.0 but we secretly take it to mean-1.0). This would make reversing the encoding process difficult for an adversary.

Alternatively, certain projections that cannot be reversed reliably could be defined-basically areas where segments has more than one output condition. This could prevent another form of adversarial attack. For example, binary classifier neurons that output values in the range of 0.3 to 0.7 could produce ambiguous encodings (as these values might indicate an attack or adversarial sample).

The method of the disclosed implementations can be accomplished by one or more computing devices including functional "modules" comprised of code executable by a computer processor to carry out the functions described above. The computing devices implementing disclosed implementations can include a variety of tangible computer readable media. Computer readable media can be any available tangible media that can be accessed by device and includes both volatile and non-volatile media, removable and non-removable media. Tangible, non-transient computer storage media include volatile and non-volatile, and removable and non-removable media implemented in any method or technology for storage of information such as computer readable instructions, data structures, program modules or other data.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

It will be appreciated by those skilled in the art that changes could be made to the disclosed implementations without departing from the broad inventive concept thereof. It is understood, therefore, that this invention is not limited to the disclosed implementations, but it is intended to cover modifications within the spirit and scope of the present invention as defined by the appended claims.

What is claimed:

1. A method for securing a model executed by a neural network, the method comprising:

receiving an output specification data structure specifying outputs of an output layer of an original neural network, wherein the original neural network is configured to execute a model;

creating an n-dimensional matrix for at least one output of the output layer of the original neural network by: defining a plurality of segments of a scalar value X of the at least one output along a number line, determining a corresponding projection algorithm for each of the plurality of segments, wherein at least one of the corresponding projection algorithms is different from another corresponding projection algorithm, and for each of the plurality of segments, projecting a scalar value X of the at least one output onto a predetermined surface, in accordance with the corresponding projection algorithm to thereby generate an n-Dimensional vector X' as an obfuscation function of X;

creating a transcoding neural network that implements the obfuscation function of X; and interfacing the transcoding neural network with the original neural network to thereby create a protected neural network which executes the model.

2. The method of claim 1, wherein the interfacing comprises appending the transcoding neural network to at least one output of the original neural network.

3. The method of claim 2, wherein the transcoding neural network includes a scaling layer, attribute layer, a decision layer, a negation layer, a normalization layer, and translation layer.

4. The method of claim 1, wherein defining a plurality of segments of a scalar value X of the output along a number line comprises defining the segments to have different sizes.

5. The method of claim 4, wherein the sizes of the segments are smaller where corresponding values of X are more likely or are critical values.

6. The method of claim 1, wherein the corresponding projection algorithms are not all the same.

7. The method of claim 1, further comprising shuffling the outputs of the original neural network.

8. A secured model implemented by a neural network, the secured model comprising:

one or more processors; and one or more non-transitory computer-readable storage media storing instructions that, when executed by the one or more processors, cause the one or more processors to perform operations comprising:

receiving an output specification data structure specifying outputs of an output layer of an original neural network, wherein the original neural network is configured to execute a model;

creating an n-dimensional matrix for at least one output of the output layer of the original neural network by, defining a plurality of segments of a scalar value X of the at least one output along a number line, determining a corresponding projection algorithm for each of the plurality of segments, wherein at least one of the corresponding projection algorithms is different from another corresponding projection algorithms, and for each of the plurality of segments, projecting a scalar value X of the at least one output onto a predetermined surface, in accordance with the corresponding projection algorithm to thereby generate an n-Dimensional vector X' as an obfuscation function of X;

creating a transcoding neural network that implements the obfuscation function of X; and wherein the transcoding neural network is interfaced with the original neural network to thereby create a protected neural network which executes the model.

9. The secured model of claim 8, wherein the interfacing comprises appending the transcoding neural network to at least one output of the original neural network.

10. The secured model of claim 9, wherein the transcoding neural network includes a scaling layer, attribute layer, a decision layer, a negation layer, a normalization layer, and translation layer.

11. The secured model of claim 8, wherein defining a plurality of segments of a scalar value X of the output along a number line comprises defining the segments to have different sizes.

12. The secured model of claim 11, wherein the sizes of the segments are smaller where corresponding values of X are more likely or are critical values.

13. The secured model of claim 8, wherein the corresponding projection algorithms are not all the same.

14. The secured model of claim 8, wherein the outputs of the original neural network are shuffled.

15. A system comprising:

one or more processors; and one or more non-transitory computer-readable storage media storing instructions that, when executed by the one or more processors, cause the one or more processors to perform operations comprising:

receiving an output specification data structure specifying outputs of an output layer of an original neural network, wherein the original neural network is configured to execute a model;

creating an n-dimensional matrix for at least one output of the output layer of the original neural network by: defining a plurality of segments of a scalar value X of the at least one output along a number line, determining a corresponding projection algorithm for each of the plurality of segments, wherein at least one of the corresponding projection algorithms is different from another corresponding projection algorithms, and, for each of the plurality of segments, projecting a scalar value X of the at least one output onto a predetermined surface, in accordance with the corresponding projection algorithm to thereby generate an n-Dimensional vector X' as an obfuscation function of X;

creating a transcoding neural network that implements the obfuscation function of X; and interfacing the transcoding neural network with the original neural network to thereby create a protected neural network which executes the model.

16. The system of claim 15, wherein the interfacing comprises appending the transcoding neural network to at least one output of the original neural network.

17. The system of claim 16, wherein the transcoding neural network includes a scaling layer, attribute layer, a decision layer, a negation layer, a normalization layer, and translation layer.

18. The system of claim 15, wherein defining a plurality of segments of a scalar value X of the output along a number line comprises defining the segments to have different sizes.

19. The system of claim 15, wherein the corresponding projection algorithms are not all the same.

20. The system of claim 15, the operations further comprising shuffling the outputs of the original neural network.

* * * * *